US011238119B2

(12) United States Patent
Malkin et al.

(10) Patent No.: US 11,238,119 B2
(45) Date of Patent: *Feb. 1, 2022

(54) DEVICE IDENTIFICATION FOR MULTIPLE DEVICE IDS

(71) Applicant: Oath Inc., New York, NY (US)

(72) Inventors: Jonathan Malkin, Sunnyvale, CA (US); Jinhui Liu, Sunnyvale, CA (US); Jerry Zhang, Sunnyvale, CA (US); Csaba Kecskemeti, Sunnyvale, CA (US); Wendell Baker, Palo Alto, CA (US)

(73) Assignee: VERIZON MEDIA INC., New York, NY (US)

(*) Notice: Subject to any disclaimer, the term of this patent is extended or adjusted under 35 U.S.C. 154(b) by 294 days.

This patent is subject to a terminal disclaimer.

(21) Appl. No.: 16/377,621

(22) Filed: Apr. 8, 2019

(65) Prior Publication Data
US 2019/0236107 A1 Aug. 1, 2019

Related U.S. Application Data

(63) Continuation of application No. 15/215,090, filed on Jul. 20, 2016, now Pat. No. 10,255,369.

(51) Int. Cl.
G06F 17/00 (2019.01)
G06F 16/9535 (2019.01)
H04L 29/08 (2006.01)
G06F 16/95 (2019.01)
G06Q 30/02 (2012.01)

(52) U.S. Cl.
CPC .......... *G06F 16/9535* (2019.01); *G06F 16/95* (2019.01); *G06Q 30/02* (2013.01); *G06Q 30/0269* (2013.01); *H04L 67/306* (2013.01)

(58) Field of Classification Search
None
See application file for complete search history.

(56) References Cited

U.S. PATENT DOCUMENTS

| 5,483,153 A | * | 1/1996 | Leeb | G01R 19/25 324/102 |
| 2005/0188268 A1 | * | 8/2005 | Verbowski | G06F 11/079 714/37 |
| 2006/0106930 A1 | * | 5/2006 | Shaffer | H04L 67/18 709/224 |
| 2007/0274525 A1 | * | 11/2007 | Takata | H04L 63/065 380/270 |

(Continued)

Primary Examiner — Hasanul Mobin
(74) Attorney, Agent, or Firm — Cooper Legal Group, LLC

(57) ABSTRACT

An electronic system may be configured to determine if a first-type device ID and a second-type device ID both identify a same device. To do so, the electronic system may preliminarily group a particular first-type ID with a particular second-type ID based on matching time slots and network addresses. Individual scores for each of the preliminary groups may be determined based on cardinalities associated with the time slots. Combined scores may then be determined for groups having the same first-type device ID and second-type device ID. A final analysis may be performed to confirm, with a sufficient level of confidence, whether first-type device IDs and second-type device IDs included in the preliminary groups identify the same device.

20 Claims, 12 Drawing Sheets

(56) References Cited

U.S. PATENT DOCUMENTS

| | | | |
|---|---|---|---|
| 2011/0096750 A1* | 4/2011 | Velandy | H04W 48/17 370/331 |
| 2012/0124161 A1* | 5/2012 | Tidwell | H04L 63/0421 709/217 |
| 2013/0339776 A1* | 12/2013 | Jagadishprasad | G06F 9/5094 713/340 |
| 2014/0214221 A1* | 7/2014 | Matthews | G01D 4/004 700/291 |
| 2014/0281031 A1* | 9/2014 | O'Connor | H04L 61/2007 709/245 |
| 2016/0182657 A1* | 6/2016 | Mukherjee | H04L 67/303 709/223 |
| 2018/0146041 A1* | 5/2018 | Moustafa | H04L 41/5025 |

* cited by examiner

DEVICE IDENTIFICATION FOR MULTIPLE DEVICE IDS

CROSS REFERENCE TO RELATED APPLICATION

This application claims priority to and is a continuation of U.S. application Ser. No. 15/215,090, filed on Jul. 20, 2016, entitled "DEVICE IDENTIFICATION FOR MULTIPLE DEVICE IDS", which is incorporated herein.

BACKGROUND

Technological advancements in mobile computing devices have changed the way people use computers and access the Internet. It is no longer commonplace for a typical user to have only a primary home computer and possibly a work computer. Instead, the typical user uses multiple computing devices, one of which is often a mobile or handheld device such as a smartphone or a tablet computer. With respect to Internet-based advertising, the use of multiple devices by a single user means that Internet-based advertisers cannot maximize personalized advertising performance by simply using a single browser cookie as a reasonable proxy for a user. Rather, in order to build comprehensive and rich user profiles, Internet-based advertisers need to look at user activity across several devices. In addition, there are increasingly fewer opportunities to identify users and track user activity through logins since a user's need to constantly login to a personal account in order to access information has decreased, especially for mobile devices and mobile applications running on mobile devices.

Since computing devices are increasingly used by a single user and not shared among several users, identifying a particular physical device for purposes of Internet-based advertising may be desirable. The task then becomes how to identify a physical device. Identifying physical devices through a network address, such as an Internet Protocol (IP) address, may not be desirable since multiple devices used by different users may be connected to the same network or otherwise have the same IP address.

One way to identify users is through device identifiers (IDs) that are integrated with web browsers and applications (e.g., mobile applications). However, currently, web browsers and applications use different device ID types or formats. As a result, a web browser and an application running on the same physical device provide different device IDs when accessing the Internet. Consequently, tracking systems that track device IDs in order to monitor user activity do not know if device IDs of different types belong to the same physical device or different physical devices. In turn, profile builders that build user profiles may create multiple, unassociated user profiles instead of one combined profile for a single device. Additionally, Internet-based advertisers or other users of the user profiles may miss opportunities to leverage already-learned information about a user because different device IDs for the same device were not linked together. As such, ways to assess or identify whether different-type device IDs belong to the same physical device may be desirable.

BRIEF DESCRIPTION OF THE DRAWINGS

The systems and methods may be better understood with reference to the following drawings and description. Non-limiting and non-exhaustive examples are described with reference to the following drawings. The components in the drawings are not necessarily to scale; emphasis instead is being placed upon illustrating the principles of the system. In the drawings, like referenced numerals designate corresponding parts throughout the different views.

DETAILED DESCRIPTION

Figure 1:
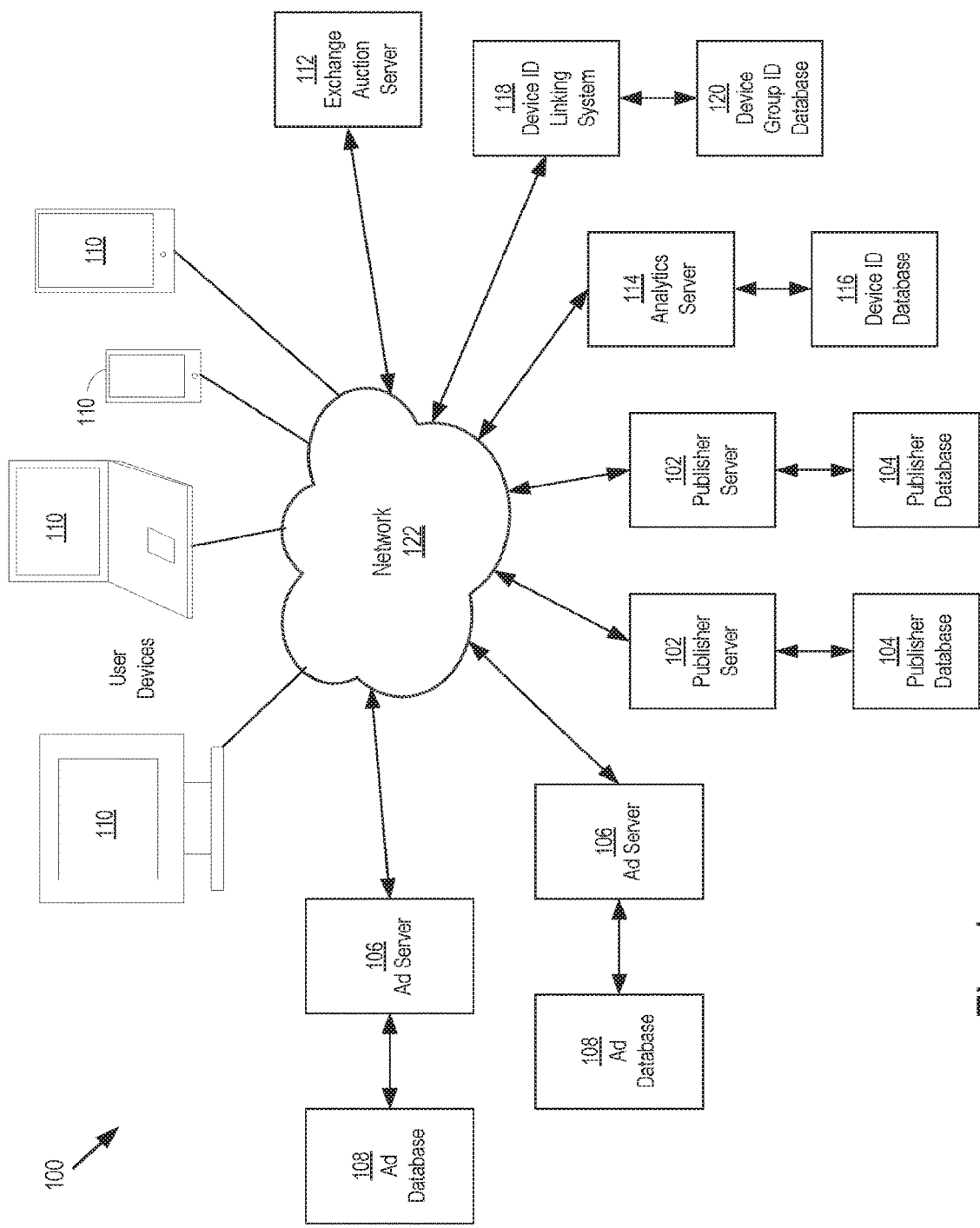
FIG. 1 is a block diagram of an example electronic system that may utilize a device linking system that identifies two device IDs as identifying the same user device.

Subject matter will now be described more fully hereinafter with reference to the accompanying drawings, which form a part hereof, and which show, by way of illustration, specific examples. Subject matter may, however, be embodied in a variety of different forms and, therefore, covered or claimed subject matter is intended to be construed as not being limited to examples set forth herein; examples are provided merely to be illustrative. Likewise, a reasonably broad scope for claimed or covered subject matter is intended. Among other things, for example, subject matter may be embodied as methods, devices, components, or systems. The following detailed description is not intended to be limiting on the scope of what is claimed.

Aspects of systems and operations, described herein, labeled as "first", "second", "third", and so on, should not necessarily be interpreted to have chronological associations with each other. In other words, such labels are used to merely distinguish aspects of the systems and operations described herein, unless the context of their use implies or expresses chronological associations.

Overview

By way of introduction, the below embodiments relate to a system that assesses whether device identifications (IDs) of different types identify the same device. Based on the assessments, certain computer-implemented processes can be improved, such as user profile management, network-based content serving, and visitor count management. In one embodiment, an electronic system incldes a memory comprising a device identification (ID) group database, and a controller. The controller is configured to: preliminarily determine that a first-type device ID and a second-type device ID identify a same device; group the first-type device ID and the second-type device ID into a device ID group in response to the preliminary identification; calculate a score for the device ID group; confirm that the first-type device ID and the second-type device ID both identify the same device based on the score; and store the first-type device ID and the second-type device ID as linked together in the device ID group database in response to the confirmation.

In some embodiments, the controller is configured to identify that the first-type device ID and the second-type device ID are both associated with a same network address in order to preliminarily identify that the first-type device ID and the second-type device ID identify the same device.

In some embodiments, the controller is further configured to identify that the first-type device ID and the second-type device ID are both associated with a same time slot in order to preliminary identify that the first-type device ID and the second-type device ID identify the same device.

In some embodiments, the controller is further configured to determine a plurality of initial scores for the device ID group. Each of the plurality of initial scores is determined for a corresponding one of a plurality of time slots in which the device ID group occurs. The controller also determines a final score based on the plurality of initial scores.

In some embodiments, the controller is configured to calculate a summation of a plurality of initial scores to determine a final score.

In some embodiments, the controller is further configured to, in order to determine a final score: calculate a plurality of logarithmic values, each based on one of the plurality of initial scores, and sum together the plurality of logarithmic values. In some of these embodiments, the plurality of logarithmic values are each further based on a weighting factor corresponding to a time slot of a respective one of the plurality of initial scores.

In some embodiments, the controller is further configured to determine first cardinalities of first-type IDs and second cardinalities of second-type IDs. Each of the first cardinalities and each of the second cardinalities correspond to one of the plurality of time slots. The controller is also configured to calculate the plurality of initial scores based on the first cardinalities and the second cardinalities.

In some embodiments, the controller is further configured to, in response to the confirmation that the first-type device ID and the second-type device ID both identify the same device, link the second-type device ID with a user profile of a user of the same device, where the user profile was already linked to the first-type device ID prior to the confirmation. In some of these embodiments, after the linking, the controller is further configured to, in response to receipt of user information associated with the second-type device ID: identify the user information as being associated with the user, and add the user information to the user profile.

In some embodiments, the user profile comprises a first user profile, and the controller is further configured to combine a second user profile associated with the second-type device ID with the first user profile to form an aggregated user profile for the user of the same device in response to the linking.

In some embodiments, a content server is configured to: after the linking, receive a content request identifying user information associated with the second-type device ID, and select content for sending to the same device, where the selection is based on user information that was initially added to the user profile prior to the linking.

In some embodiments, the controller is further configured to receive visitor information indicating a user visited a network location, the visitor information identifying one of the first-type device ID or the second-type device ID, in response to receipt of the visitor information, apply the first-type device ID or the second-type device ID included in the visitor information to the device ID group database, and update a visitor count based on the link between the first-type device ID and the second-type device ID in the device ID group database.

In some embodiments, the first-type ID is associated with one of a web browser or an application, and the second-type ID is associated with the other of the web browser or the application, each of the web browser and the application being configured to run on the same device.

In another embodiment, a method of using device identifications of different types is performed. The method includes: forming, with a controller, a plurality of device identification (ID) groups, each of the device ID groups including a same first-type device ID and a same second-type device ID as each other, each of the plurality device ID groups being associated with one of a plurality of time slots within a predetermined time period; calculating, with the controller, a combined score based on individual scores for the plurality of device ID groups; determining, with the controller, that the same first-type device ID and the same second-type device ID identify a same device based on the combined score; and linking, with the controller, the same first-type device ID with the same second-type device ID in a memory comprising a device ID group database.

In some embodiments, the method includes: forming, with the controller, one of the plurality of device ID groups in response to identifying, with the controller, that the same first-type device ID and the same second-type device ID are both associated with a same network address and a same time slot.

In some embodiments, the method includes: calculating, with the controller, first cardinalities of first-type device IDs and second cardinalities of second-type device IDs, each of the first cardinalities and each of the second cardinalities corresponding to one of the plurality of time slots within the predetermined time period; and calculating, with the controller, the individual scores based on the first cardinalities and the second cardinalities.

In some embodiments, calculating the combined score comprises: summing, with the controller, the individual scores or logarithmic values based on the individual scores.

In some embodiments, the method includes: serving, with a content server, selected content based on user information included in a user profile associated the same first-type device ID and the same second-type device ID.

In another embodiment, a non-transitory computer readable storage medium includes instructions executable by a computer processor. The instructions include: instructions to group a first-type device ID and the second-type device ID into a device ID group based on one or more criteria; instructions to calculate a score for the device ID group; instructions to determine that the first-type device ID and the second-type device ID identify a same device based on the score; and instructions to store the first-type device ID and the second-type device ID as linked together in a device ID group database in response to the confirmation.

Other embodiments are possible, and each of the embodiments can be used alone or together in combination. Accordingly, various embodiments will now be described with reference to the attached drawings.

DESCRIPTION OF THE DRAWINGS

FIG. 1 illustrates a block diagram of an example electronic system 100 that includes example devices of a network that can communicatively couple with an example device identification (ID) linking system that determines whether to identify device IDs of different types as belonging to the same user device. The example electronic system 100 in the example of FIG. 1 includes publisher servers 102, publisher databases 104, ad servers 106, ad databases 108, user devices 110, and an exchange auction server 112. The servers and databases can be communicatively coupled over a network 122, which may be a computer network. The aforementioned may each be one or more server computers.

In the information system 100, the publisher servers 102 may provide content (also referred to as medium or electronic property) that a user device 110 wants to access and/or retrieve. Non-limiting examples of content include a website, a webpage, web-based search results provided by a search engine, a software application (app), a video game, or e-mail. Example publisher servers may include a content server or a search engine server. By providing the content, the publisher servers 102 may generate advertising inventory, which may be a supply of opportunities to display advertising in, along with, or through the provided content. The publisher server 102 may offer to sell its advertising inventory and/or send requests to submit offers or bids to buy its advertising inventory. When advertising inventory is purchased, the purchaser may obtain one or more ad impressions. Each ad impression may be a display of an advertisement (ad) with a user device 110.

A publisher server 102 may access content data or other information defining and/or associated with the content it provides either from a publisher database 104 or from another location accessible over the network 122. The publisher server 102 may communicate the content data to other devices over the network 122. Additionally, the publisher server 102 may provide a publisher front end to simplify the process of accessing the content data. The publisher front end may be a program, application or software routine that forms a user interface. In a particular example, the publisher front end is accessible as a website with electronic properties that an accessing publisher may view on a publisher device. The publisher may view and edit content data using the publisher front end.

The publisher server 102 may include logic and data operative to format the content data for communication to a user device. The content data may be formatted to a content item that may be included in a stream of content items provided to a user device 110. The formatted content items can be specified by appearance, size, shape, text formatting, graphics formatting and included information, which may be standardized to provide a consistent look for content items in the stream.

The user devices 110 may be any computing device capable of sending or receiving signals, such as via a wired connection and/or wirelessly, over the network 122. Non-limiting example user devices may include a desktop computer, a laptop computer, a smartphone, or a tablet computer, as shown in FIG. 1. The user devices 110 may vary in terms of capabilities or features. In addition, the user devices 110 may include or may execute a variety of operating systems, including a personal computer operating system, such as a WINDOWS, MAC OS X OR LINUX, or a mobile operating system, such as 10S, ANDROID, or WINDOWS MOBILE, or the like. The user devices 110 may include or may execute a variety of possible applications, such as a client software application enabling communication with other devices, such as communicating messages, such as via email, short message service (SMS), or multimedia message service (MMS), including via a network, such as a social network, including, for example, FACEBOOK, LINKEDIN, TWITTER, FLICKR, or GOOGLE+, to provide only a few possible examples. The user devices 110 may also include or execute an application to communicate content, such as, for example, textual content, multimedia content, or the like. A user device 110 may also include or execute an application to perform a variety of possible tasks, such as browsing, searching, playing various forms of content, including locally or remotely stored or streamed video, or games.

Additionally, a user device 110 may be configured to present online content items and online advertisements to a user of the user device 110. During operation, a user of a user device 110 may search for and obtain content from sources over the network 122, such as obtaining content from a publisher server 102, an ad server 106, or an exchange auction server 112. Advertisers may provide content items for placement on online properties, such as web pages, and other communications sent over the network 122 to the user devices 110.

The ad server 106 may be one or more servers. Alternatively, the ad server 106 may be a computer program, instructions, and/or software code stored on a computer-readable storage medium that runs on one or more processors of one or more servers. The ad server 106 may operate to serve advertisements (ads) to the user devices 110 for display or reception of the ads by the user devices 110. An advertisement may include data of a variety of different types, such as text data, graphic data, image data, video data, or audio data. The advertisement data may also include data defining content item information that may be of interest to a user of a user device 110. An advertisement may further include data defining links to other online properties reachable through the network 122.

The ad server 106 may include logic and data operative to format the advertisement data for communication to a user device 110. The advertisement data may be formatted for inclusion in a stream of content items and advertising items provided to a user device 110. The formatted items can be specified by appearance, size, shape, text formatting, graphics formatting and included information, which may be standardized to provide a consistent look for items in the stream. The ad server 106 may be in data communication with the ad database 108. The ad database 108 may store information, including data defining advertisements and/or advertisement creatives, to be served to the user devices 110. This advertisement data may be stored in the ad database 108 by the ad server 106 or by another data processing device.

Further, the ad server 106 may be in data communication with the network 122. The ad server 106 may communicate advertisement data and other information associated with advertisements to devices over the network 122. This advertisement data and other information may be communicated to a user device 110, such as using the ad server 106 or another advertiser device being operated by an advertiser. An advertiser operating an advertiser device may access the ad server 106 over the network 122 to access the advertisement data or other information. This access may include developing creatives, adding advertisement data, or deleting advertisement data, as non-limiting examples. The ad server

106 may then provide the advertisement data to other network devices or servers in the system 100.

The ad server 106 may provide an advertiser front end to simplify the process of accessing the advertising data of an advertiser. The advertiser front end may be a program, application or software routine that forms a user interface. In one particular example, the advertiser front end is accessible as a website with electronic properties that an accessing advertiser may view on the advertiser device. The advertiser may view and edit advertising data using the advertiser front end. After editing the advertising data, the advertising data may then be saved to the ad database 108 for subsequent communications to a user device 110. The advertiser front end may also provide a graphical user interface for simulating campaigns according to operations performed by the enhanced targeting server 116 and/or the AR lift server 130.

In addition to communicating advertisements over the network 122, the ad servers 106 may determine whether to purchase advertisement inventory and for how much. The publisher servers 102 and the ad servers 106 may participate in an auction-based marketplace in which the publisher servers 102 may serve requests (herein referred to as ad requests) for offers to buy advertisement inventory. In response, the ad servers 106 may submit bids to buy the inventory when they so choose. The bids may be submitted in a real-time bidding (RTB) format, and the ad servers 106 may be operating in the auction-based marketplace under the direct control of the advertiser, or alternatively as a representative or proxy of the advertisement, such as a demand-side platform (DSP) for example.

The auction-based market place may be conducted through the exchange auction server 112. Rather than the publisher servers 102 sending the ad requests, the exchange auction server 112 may be the network entity in the system 100 sending the ad requests. The sending of an ad request may be initiated when the opportunity of an ad impression occurs, such as when a user device 110 accesses certain content provided by a publisher server 102. For example, the user device 110 may navigate to a website or access a webpage, thus creating an opportunity for an advertisement to be displayed. The exchange auction server 112 may then send an ad request to the ad servers 106, requesting bids to purchase an ad impression for the content creating the opportunity. The ad servers 106 may determine whether they want to bid, and if they do so, may send bids to the exchange auction server 112 with their bid amounts. The exchange auction server 112 may then determine the winning bid among the submitted bids, and have the advertisement associated with the winning bid displayed on a user device 110 in conjunction with the content that created the opportunity in the first place.

The aforementioned servers and databases may be implemented through a computing device. A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally, a server may include a central processing unit and memory. A server may also include a mass storage device, a power supply, wired and wireless network interfaces, input/output interfaces, and/or an operating system, such as WINDOWS SERVER, MAC OS X, UNIX, LINUX, FREEBSD, or the like.

The aforementioned servers and databases may be implemented as online server systems or may be in communication with online server systems. An online server system may include a device that includes a configuration to provide data via a network to another device including in response to received requests for page views or other forms of content delivery. An online server system may, for example, host a site, such as a social networking site, examples of which may include FLICKER, TWITTER, FACEBOOK, LINKEDIN, or a personal user site (such as a blog, vlog, online dating site, etc.). An online server system may also host a variety of other sites, including business sites, educational sites, dictionary sites, encyclopedia sites, wikis, financial sites, government sites, etc.

An online server system may further provide a variety of services that may include web services, third-party services, audio services, video services, email services, instant messaging (IM) services, SMS services, MMS services, FTP services, voice over IP (VOID) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as an online server system include desktop computers, multiprocessor systems, microprocessor-type or programmable consumer electronics, etc. The online server system may or may not be under common ownership or control with the servers and databases described herein.

The network 122 may include a data communication network or a combination of networks. A network may couple devices so that communications may be exchanged, such as between a server and a client device or other types of devices, including between wireless devices coupled via a wireless network, for example. A network may also include mass storage, such as a network attached storage (NAS), a storage area network (SAN), or other forms of computer or machine readable media, for example. A network may include the Internet, local area networks (LANs), wide area networks (WANs), wire-line type connections, wireless type connections, or any combination thereof. Likewise, sub-networks that employ differing architectures or that are compliant or compatible with differing protocols may intemperate within a larger network, such as the network 122.

Various types of devices may be made available to provide an interoperable capability for differing architectures or protocols. For example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links, including satellite links, or other communication links or channels, such as may be known to those skilled in the art. Furthermore, a computing device or other related electronic devices may be remotely coupled to a network, such as via a telephone line or link, for example.

Also, the described methods and systems may be implemented at least partially in a cloud-computing environment, at least partially in a server, at least partially in a client device, or in a combination thereof.

The electronic system 100 may also include an analytics server 114 in communication with a device ID database 116. The analytics server 114 may be configured to track device IDs and related information associated with user devices 110 when user devices 110 send requests for content data over the network 122. The analytics server 114 may store the tracked device IDs and related information in the device ID database 116. The electronic system 100 may further include a device ID linking system 118 in communication with a device ID group database 120. The device ID linking system 118 may be configured to group together device IDs of different types that it determines belong to and/or identify a same user device 110. The device ID linking system 118 may store device ID groups in the device ID group database 120. The analytics server 114, the device ID database 116, the device ID linking system 118, and the device ID group database 120 are described in further detail below.

Figure 2:
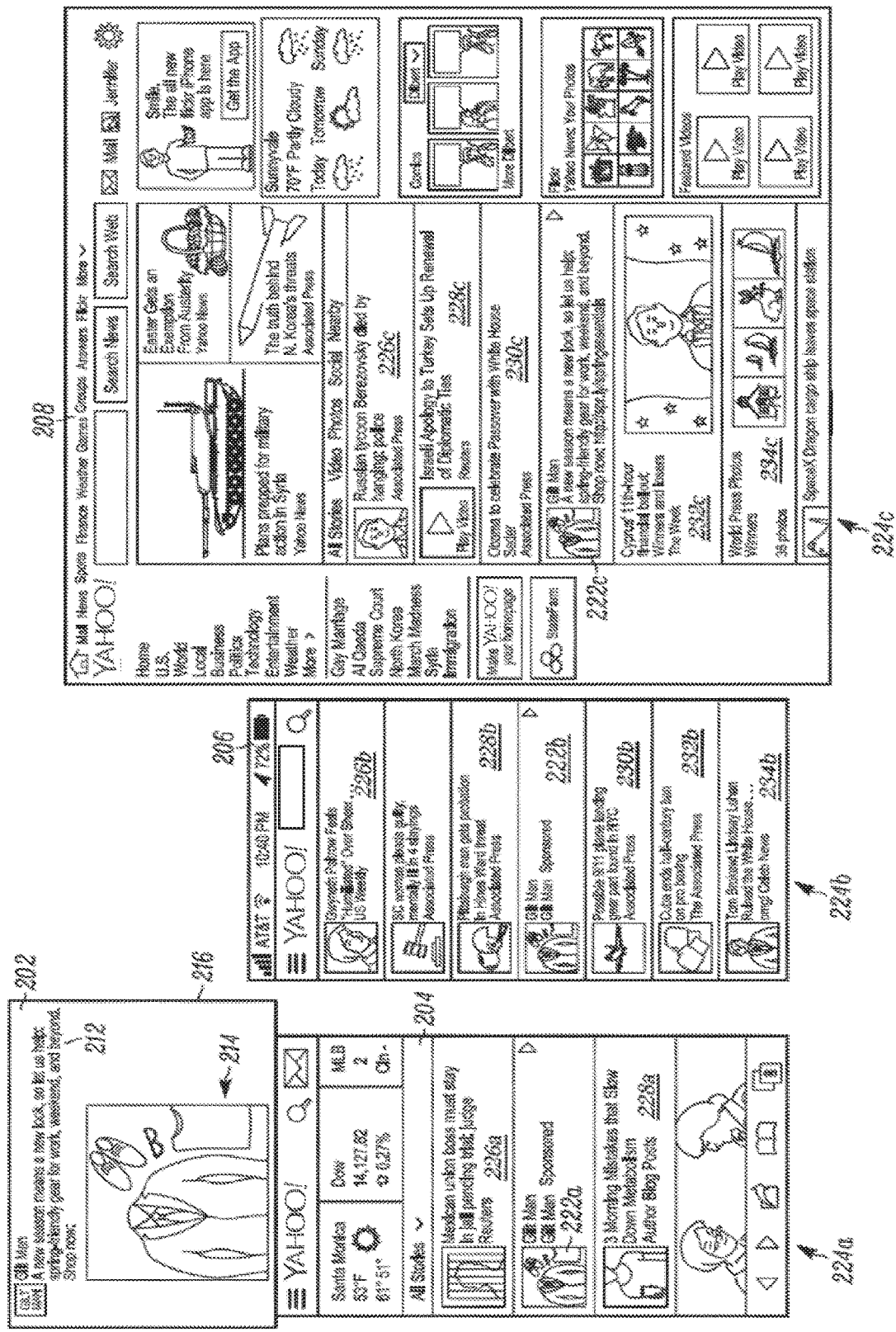
FIG. 2 illustrates displayed content items (which includes ad items) of example screens rendered by client-side applications.

FIG. 2 illustrates displayed content items (including ad items) of example screens rendered by client-side applications of the user devices 110. The content items displayed may be provided by the publisher servers 102 and the ad servers 106. In FIG. 2, a display ad 202 is illustrated as displayed on a variety of displays including a mobile web device display 204, a mobile application display 206 and a personal computer display 208. The mobile web device display 204 and the mobile application display 206 may be shown on the display screen of a mobile user device 110, such as a smartphone or a tablet. The personal computer display 208 may be displayed on the display screen of a user device 110 that is a personal computer (PC), such as a desktop computer or a laptop computer.

The display ad 202 shown in FIG. 2 may be formatted for display on a user device 110, but not as part of a stream, in order to illustrate an example of the contents of such a display ad. The display ad 202 may include text 212 and/or graphic images 214 within a defined boundary 216. The display ad 202 can be developed by an advertiser for placement on an electronic property, such as a web page or an application, and sent to a user device 110 operated by a user. The display ad 202 may be placed in a wide variety of locations on the electronic property. The defined boundary 216 and the shape of the display ad can be matched to a space available on an electronic property. If the space available has the wrong shape or size, the display ad 202 may not be useable.

In these examples, the display ad is shown as a part of streams 224a, 224b, and 224c. The streams 224a, 224b, and 224c include a sequence of items displayed, one item after another, for example, down an electronic property viewed on the mobile web device display 204, the mobile application display 206 and the personal computer display 208. The streams 224a, 224b, and 224c may include various types of items. In the illustrated example, the streams 224a, 224b, and 224c include content items and advertising items. For example, stream 224a includes content items 226a and 228a along with advertising item 222a; stream 224b includes content items 226b, 228b, 230b, 232b, 234b and advertising item 222b; and stream 224c includes content items 226c, 228c, 230c, 232c and 234c and advertising item 222c. With respect to FIG. 2, the content items can be items published by non-advertisers, e.g., the publisher servers 102 (FIG. 1). These content items may include advertising components. Each of the streams 224a, 224b, and 224c may include a number of content items and advertising items.

The content items positioned in any of streams 224a, 224b, and 224c may include news items, business-related items, sports-related items, etc. Further, in addition to textual or graphical content, the content items of a stream may include other data as well, such as audio and video data or applications. Content items may include text, graphics, other data, and a link to additional information. Clicking or otherwise selecting the link may re-direct the application (e.g., browser) on the user device 110 to an electronic property referred to as a landing page that contains the additional information. While the example streams 224a, 224b, and 224c are shown with a visible advertising item 222a, 222b, and 222c, respectively, a number of advertising items may be included in a stream of items. Also, the advertising items may be slotted within the content, such as slotted the same for all users or slotted based on personalization or grouping, such as grouping by audience members or content. Adjustments of the slotting may be according to various dimensions and algorithms. Also, slotting may be according to campaign control.

Figure 3:
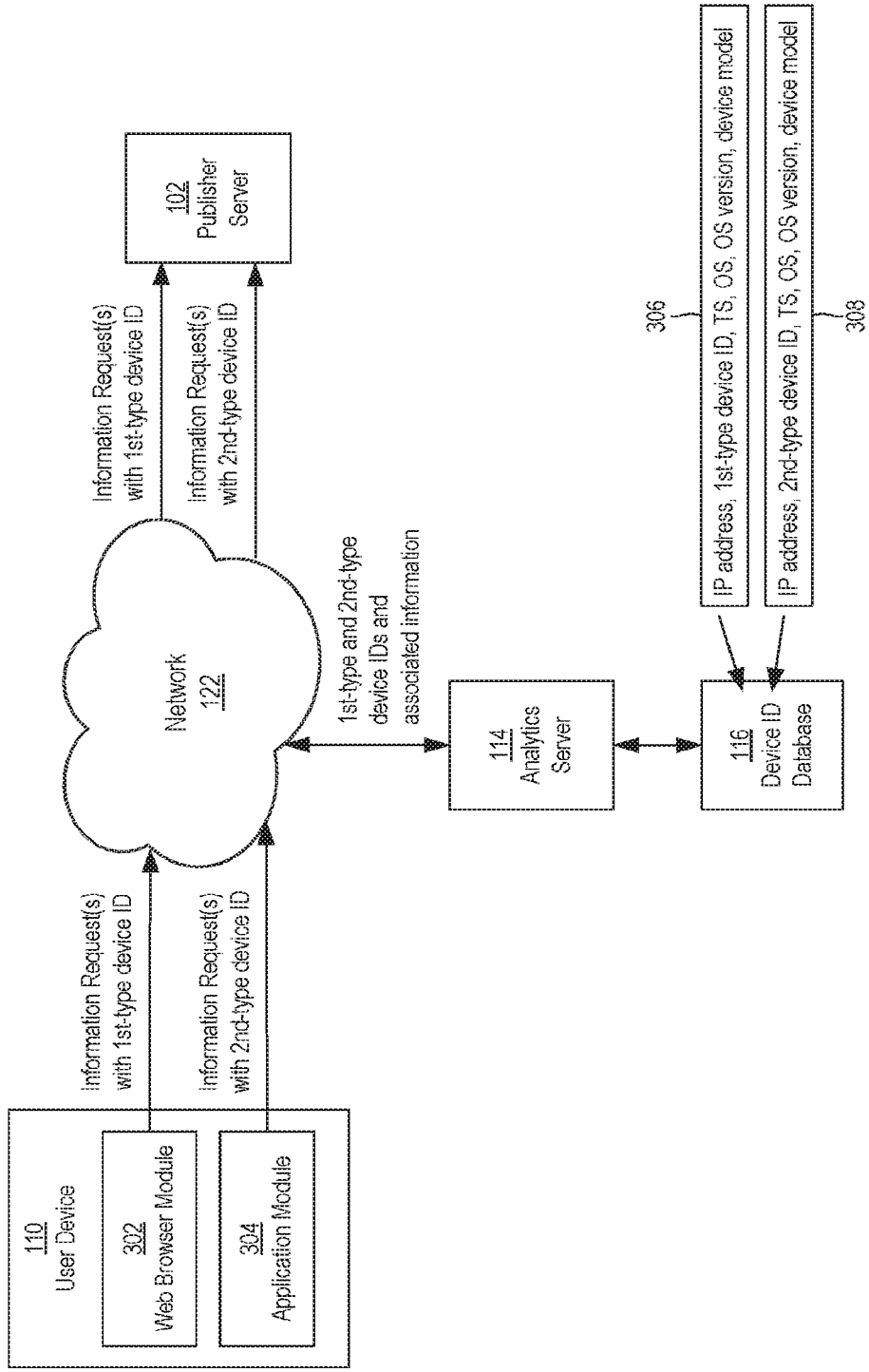
FIG. 3 is a block diagram of components of the electronic system involved in transmitting and collecting device IDs.

FIG. 3 shows components of the electronic system 100 that may be involved in the tracking and/or collection of device IDs and related information. In general, a user device 110 may be configured to transmit a request for information over the 110. Any type of information may be possible, non-limiting examples of which may include a webpage, email, information to be displayed in an application such as news-related information or sports-related information. The user device 110 may include two modules to generate the information requests, including a web browser module 302 configured to execute one or more web browsers, and an application module 304 configured to execute one or more non-web browser applications.

As used herein, a module or sub-module may be hardware or a combination of hardware and software. For example, each module may include an application specific integrated circuit (ASIC), a field programmable gate array (FPGA), a circuit or circuitry, a digital logic circuit, an analog circuit, a combination of discrete circuits, gates, or any other type of hardware or combination thereof. In addition or alternatively, each module or sub-module may be or may be a component of a controller or control circuitry. In addition or alternatively, each module may include memory hardware that comprises instructions executable with a processor or processor circuitry to implement one or more of the features of the module. When any one of the module includes the portion of the memory that comprises instructions executable with the processor, the module may or may not include the processor. In some examples, each module may just be the portion of the memory or other non-transitory computer readable medium that comprises instructions executable with or by the processor to implement the features of the corresponding module without the module including any other hardware. Because each module includes at least some hardware even when the included hardware comprises software, each module may be interchangeably referred to as a hardware module.

Additionally, as used herein, the term database refers to a combination of data or a certain organized collection of data and the hardware storage that is storing the data or data collection. The hardware storage may include volatile memory, non-volatile memory, a combination thereof, or other type of non-transitory computer readable medium. Accordingly, the term database may be interchangeably referred to as a hardware database.

When the web browser module 302 generates an information request, such a request may identify the information being requested, as well as information associated with the user device 110 and time information, such as a time stamp (TS), indicative of when the information request was generated and/or sent from the user device 110. Information associated with the user device 110 may include a network address (e.g., an Internet Protocol (IP) address), a first-type device ID, information identifying the operating system (OS) that the user device 110 is using, and optionally information identifying the version of the operating system and/or information identifying a device model of the user device 110. Other information associated with the user device 110 may be possible. Also, in some example configurations, the first-type device ID may identify a type or name of the web browser being executed by the web browser module 302 (e.g., Firefox, Internet Explorer, Microsoft Edge, Google Chrome, Operate, Safari, etc.). Additionally, all or at least some of the information may be included in and/or in the form of a cookie, although other implementations may be possible.

Similarly, when the application module 302 generates an information request, such a request may identify the information being requested, as well as information associated with the user device 110 and time information. Information associated with the user device 110 may include a network address (e.g., an Internet Protocol (IP) address), a second-type device ID, information identifying the operating system (OS) that the user device 110 is using, and optionally information identifying the version of the operating system and/or information identifying a device model of the user device 110. Other information associated with the user device 110 may be possible. Also, in some example configurations, the second-type device ID may be an advertising ID formatted according to the operating system being used by the user device 110. As examples, the advertising ID may be an ID for Advertisers (IDFA) where the user device 110 is running on iOS, or may be a Google Play Store Advertising ID (GPSAID) where the user device 110 is running on Android.

An information request (either generated with the web browser module 302 or the application module 304) may be sent from the user device 110, communicated over the network 122, and received with a publisher server 102 (e.g., a web server), which may respond to the request by transmitting the requested information back to the user device 110 over the network 122.

In addition to the publisher server 102 handling the request, the analytics server 114, which may include one or more computing devices, may track and/or collect the information associated with the user device 110 and the time information. The analytics server 114 may further be configured to store the collected information in the device ID database 116. FIG. 3 shows an example first entry 306 in the device ID database 116 corresponding to an information request originating from the web browser module 302 as including an IP address (or other network address), a first-type device ID, a time stamp (TS), an operating system (OS), an OS version, and a device model. Additionally, an example second entry 308 in the device ID database 116 corresponding to an information request originating from the application module 304 may include an IP address (or other network address), a second-type device ID, a time stamp (TS), an operating system (OS), an OS version, and a device model. In other examples of the first entry 306 and/or the second entry 308, less information may be included. For example, the OS, the OS version and/or the device model may not be included and/or may not be expressly indicated in the first entry 306 and/or the second entry 308. In other examples more or alternative information may be included.

Although FIG. 3 shows only a single user device 110 sending information requests over the network 122, multiple user devices 110, each including a web browser module and an application module, may be in communication with the network 122 and configured to send information requests over a given time period (e.g., hours, days, weeks, months, years, etc.). The analytics server 114 may collect the various first-type device IDs and the second-type device IDs and related information for the various user devices 110 sending information requests over the network 122, and store the information in the device ID database 116.

The entries in the device ID database 116 may not expressly include a unique identifier that uniquely identifies a single physical user device 110 that is common between entries corresponding to information requests originating with web browser modules and information requests originating with application modules. In other words, there may not be information in the entries of the device ID database 116 that expressly identifies whether a given first-type device ID and a given second-type device ID identify and/or belong to the same user device 110 or different user devices 110.

Figure 4:
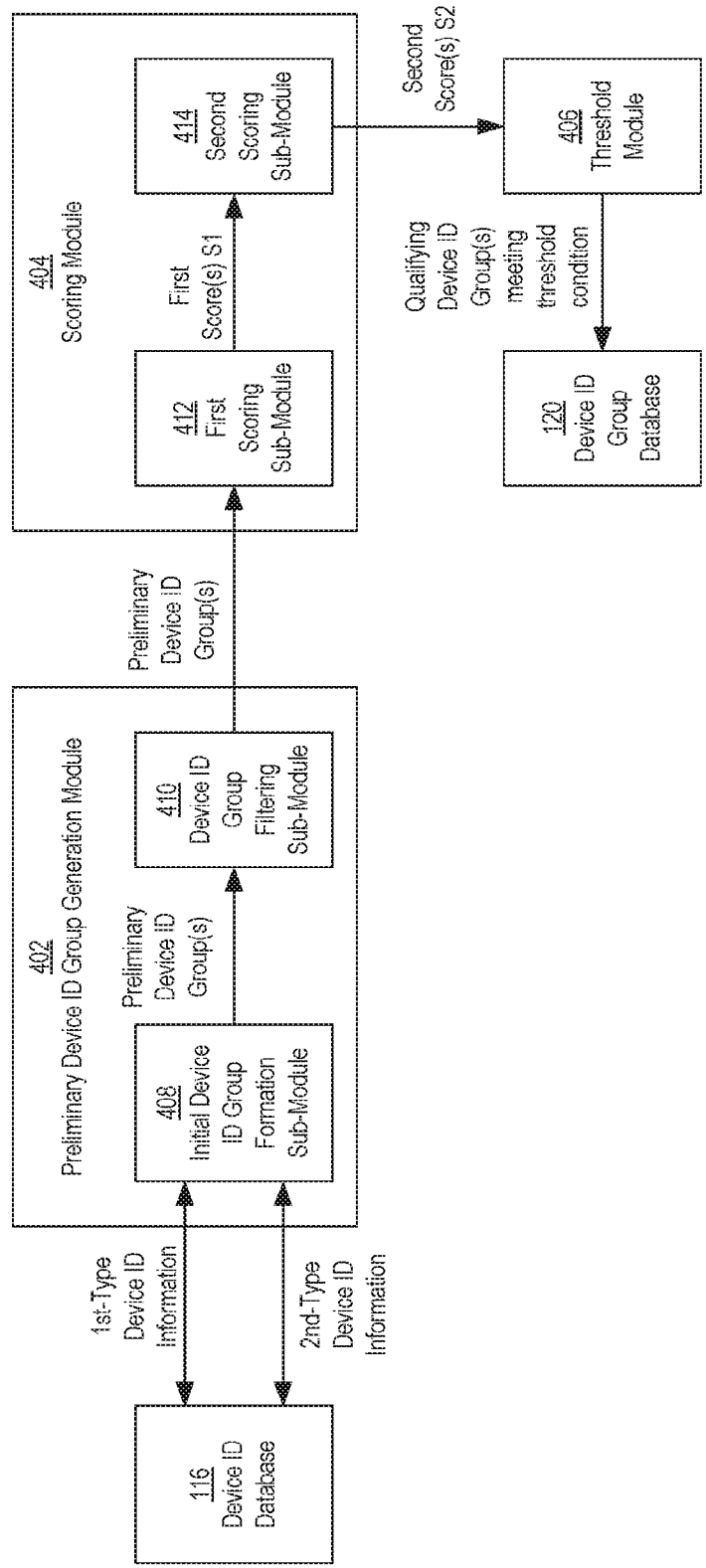
FIG. 4 is a block diagram of components of the device linking system of FIG. 1 coupled to a device ID database and a device ID group database.

FIG. 4 shows components of the device ID linking system 118 that are used to assess whether a given first-type device ID and a given second-type device ID belong to a same user device 110. The components of the device ID linking system 118 may include a preliminary device ID group generation module 402 that is configured to generate preliminary device ID groups or groupings, with each preliminary device ID group including a first-type device ID and a second-type device ID. The generation of the preliminary device ID groups may be indicative of a preliminary determination made by the preliminary device ID group generation module 402 that a given first-type device ID and a given second-type device ID grouped together identify and/or belong to the same user device 110. The device ID linking system 118 may further include a scoring module 404 that is configured to generate a score for each of the preliminary device ID groups. The device ID linking system 118 may also include a threshold module 406 that is configured to determine, for each of the preliminary device ID groups, whether a first-type device ID and a second-type device ID of a particular preliminary device ID group qualify as identifying and/or belonging to a same user device 110 based on the score associated with that particular preliminary device ID group. Otherwise stated, the threshold module 406 may be configured to confirm whether the preliminary determinations made by the preliminary device ID group generation module 402 are correct or not based on the scoring performed by the scoring module 404. If a particular preliminary device ID group qualifies, then the threshold module 406 may consider that particular preliminary device ID group as a qualifying device ID group and store the qualifying device ID group, including the associated first-type device ID and the second-type device ID, in the device ID group database 120.

In further detail, in one example configuration shown in FIG. 4, the initial device ID group generation sub-module 402 may include an initial device ID group formation sub-module 408 and a device ID group filtering sub-module 410. The initial device ID group formation sub-module 408 may be configured to access the device ID database 116 and analyze the entries in the device ID database 116 to form or generate one or more preliminary device ID groups. The initial device ID group formation sub-module 408 may apply one or more criteria to determine whether a given first-type device ID in the device ID database 116 is to be grouped with a given second-type device ID in the device ID database 116. In particular, the initial device ID group formation sub-module 408 may determine to group a given first-type device ID with a given second-type device ID to form a preliminary device ID group if they are associated with a same network address (e.g., IP address) and a same time slot (e.g., if their respective time stamps both fall in the same time slot). Otherwise stated, the initial device ID group formation sub-module 408 may make a preliminary determination that the first-type device ID and the second-type device ID with matching network addresses and time slots identify the same user device 110. In response to making the preliminary determination, the initial device ID group formation sub-module 408 may group the first-type device ID and the second-type device ID together in a preliminary device ID group that is associated with a particular network address and a particular time slot.

A time slot (or time window or time interval) may be any duration of time. An example time slot may be one hour, although other amounts of time for a time slot may be possible. In general, there may be tradeoffs between usage of a particular user device 110 and the number of user devices 110 addressed with the same IP address when choosing the duration of the time slot. Increasing the size of the time slot may increase the chance that a particular user device 110 will communicate over the network 122 using both a web browser and an application, but will also increase the chance that more than one user device 110 will be communicating with the network 122 under the same IP address. Conversely, decreasing the size of the time slot may decrease the chance that a particular user device 110 will communicate over the network 122 using both a web browser and an application, but will also decrease the chance that more than one user device 110 will communicate with the network 122 under the same IP address.

After the initial device ID group formation sub-module 402 forms the preliminary device ID groups, it may send the preliminary device ID groups to a device ID group filtering sub-module 410, which may determine to filter out or discard preliminary device ID groups based on preliminary device ID groups not meeting additional or further criteria. One additional criteria may be matching operating systems. That is, the device ID group filtering module 404 may discard a preliminary device ID group is its first-type device ID and second-type device ID are associated with different operating systems. As an example, if the first-type device ID is associated with iOS and the second-type device ID is associated with Android, then the preliminary device ID group formed with those first-type and second-type device IDs may be discarded. Other criteria may include matching operating system versions, matching device models, and/or whether the associated IP address is a general mobile carrier IP address. With respect to that last criterion, if the IP address associated with a given preliminary device ID group is a general IP address for a mobile carrier/wireless communications service provider (e.g., Verizon, AT&T, T-Mobile, Sprint, etc.), then the device ID group filtering sub-module 410 may determine to discard or filter out that preliminary device ID group.

Other example configurations for the preliminary device ID group generation module 402 may not use two distinct stages of group formation and filtering. Instead, the device ID linking system 118 may have a single preliminary device ID group formation stage that considers all of the various criteria at once to determine whether to form a preliminary device ID group for a given first-type device ID and a given second-type device ID. Various ways of forming the preliminary groups based on a certain number of criteria may be possible.

In addition, the preliminary device ID group generation module 402 may be configured to generate the preliminary device ID groups for a predetermined time period or a predetermined number of time slots. An example predetermined time period may be one day (or 24 one-hour time slots), although other size time periods may be possible. Upon generating the preliminary device ID groups for the predetermined time period, the preliminary device ID group generation module 402 may provide the preliminary device ID groups to the scoring module 404.

The scoring module 404 may include a first scoring sub-module 412 and a second scoring sub-module 414. The first scoring sub-module 412 may be configured to calculate a first or initial score S1 for each of the preliminary device ID groups. As previously described, two criteria for forming the preliminary device ID groups may be matching IP address and matching time slot. As such, each first score S1 calculated by the first scoring sub-module 412 may be for a particular combination of a first-type device ID and a second-type device ID that is associated with a particular IP address and a particular time slot. In one example configuration, the first score S1 for a preliminary device ID group of a particular IP address and a particular time slot may be based on the cardinality of the first-type device IDs and the cardinality of the second-type device IDs that are associated with the particular IP address and the particular time slot. In a particular, example, the first score S1 may be the inverse of a product of the cardinalities, which may be represented mathematically as:

$$S1_{t_i}^{IP_j}(ID1_n, ID2_k) = \frac{1}{|N_{t_i}^{IP_j}| \cdot |K_{t_i}^{IP_j}|}, \quad (1)$$

where $S1_{t_i}^{IP_j}(ID1_n, ID2_k)$ denotes a first score S1 for a preliminary device ID group having a particular first-type device ID, $ID1_n$, and a particular second-type device ID, $ID2_k$, associated with a particular IP address $IP_j$ and a particular time slot $t_i$; where $|N_{t_i}^{IP_j}|$ denotes the cardinality of the first-type device IDs associated with the particular IP address $IP_j$ and the particular time slot $t_j$; and where $|K_{t_i}^{IP_j}|$ denotes the cardinality of the second-type device IDs associated with the particular IP address $IP_j$ and the particular time slot $t_i$.

To briefly illustrate, suppose for a given IP address $IP_j$ and a given time slot $t_i$, the device ID information stored in the device ID database 116 indicates three first-type device IDs associated with the given IP address $IP_j$ and the given time slot $t_i$: $\{ID1_1, ID1_2, ID1_3\}$, and also indicates two second-type device IDs associated with the given IP address $IP_j$ and the given time slot $t_i$: $\{ID2_1, ID2_2\}$. Accordingly, the cardinality of the first-type device IDs for the given IP address $IP_j$ and the given time slot $t_i$ is 3, and the cardinality of the second-type device IDs for the given IP address $IP_j$ and the given time slot $t_i$ is 2. As such, the first scores S1 for each of the preliminary device ID groups associated with the given IP address $IP_j$ and the given time slot $t_i$ is ⅙.

Upon generating first scores S1 for each of the preliminary device ID groups associated with particular IP addresses and particular time slots over the predetermined time period, the first scoring sub-module 412 may provide the first scores S1 to the second scoring sub-module 414. In response, the second scoring sub-module 414 may be configured to combine or aggregate first scores S1 for preliminary device ID groups having the same particular first-type device ID and the same particular second-type device ID over the plurality of time slots within the predetermined time period. To illustrate, using the above example, suppose a particular device ID group including a given first-type device ID, e.g., $ID1_2$, and a given second-type device ID, e.g., $ID2_1$, is associated with each of three time slots—$t_1$, $t_2$, $t_3$—within a given predetermined time period. Accordingly, the first scoring sub-module 412 may calculate a first score for the particular device ID group for each of the three time slots—$S1_1(ID1_2,ID2_1)$, $S1_2(ID1_2, D2_1)$, $S1_3(ID1_2, ID2_1)$. Subsequently, the second scoring sub-module 414 may calculate a second score $S2(ID1_2,ID2_1)$ based on a combination or an aggregation of the three first scores $S1_1(ID1_2, ID2_1)$, $S1_2(ID1_2, D2_1)$, $S1_3(ID1_2,ID2_1)$.

For some example configurations, the second scoring sub-module 414 may be configured to generate a second score for a particular preliminary device ID group using a first approach that sums together the first scores. In a particular configuration, the second score may be an average of the first scores, which may be mathematically represented as:

$$S2_T(ID1_n, ID2_k) = \frac{1}{M} \sum_{IP,t \in T} S1_{t_i}^{IP_j}(ID1_n, ID2_k), \quad (2)$$

where $S2_T(ID1_n,ID2_k)$ denotes a second score for a particular preliminary device ID group having a particular first-type device ID, $ID1_n$, and a particular second-type device ID, $ID2_k$, for a given predetermined time period T; where $$\sum_{IP,t \in T} S1_{t_i}^{IP_j}(ID1_n, ID2_k)$$

denotes the sum of all first scores of preliminary device ID groups having the same particular first-type device ID, $ID1_n$, and the same particular second-type device ID, $ID2_k$, for all associated IP addresses, and over all time slots t within the predetermined time period T; and where M is the number of first scores S1 being summed.

A second score S2 may be considered a confidence score in that it is indicative of a level of confidence that a particular first-type device ID, $ID1_n$, and a particular second-type device ID, $ID2_k$, belong to and/or identify the same user device 110. The above-described first approach that sums the first scores together may not factor and/or take into account repetition of occurrences. For example, suppose a first preliminary device ID group has a first particular first-type device ID and a first particular second-type device ID, denoted as $(ID1_{n1},ID2_{k1})$, and suppose that the first preliminary device ID group uniquely appears on the same IP address on 29 of 30 days of a month. However, on one of the days, an additional first-type device ID appears. Additionally, suppose a second preliminary device ID group has a second particular first-type device ID and a second particular second-type device ID, denoted as $(ID1_{n2}, ID2_{k2})$, and suppose that second preliminary device ID group uniquely appears once during the month. Using the first approach, the second scoring sub-module 414 may generate a higher second (confidence) score for the second preliminary device ID group than the first preliminary device ID group, which may be counterintuitive or misleading.

In order to factor and/or take into account repetition of occurrence or appearance in the device ID database 116, the second scoring sub-module 414 may be configured to calculate second scores using a second approach that sums logarithms (or logs) of first scores. In a particular example configuration, the second scoring sub-module 414 may sum natural logs (ln) of the first scores, and the second score may be based on the exponential of the summation result. In one example, the second scoring sub-module 414 may calculate the second scores according to the following mathematical equation:

$$S2_T(ID1_n, ID2_k) = 1 - \exp\left[\sum_{IP,t \in T} \ln(1 - \omega_t \cdot \alpha \cdot S1_{t_i}^{IP_j}(ID1_n, ID2_k)\right], \quad (3)$$

where, like equation (2), the summation term $$\sum_{IP,t \in T}$$

denotes that first scores for preliminary device ID groups having the same particular first-type device ID, $ID1_n$, and the same particular second-type device ID, $ID2_k$, for all associated IP addresses, and over all time slots t within the predetermined time period T, are summed together. In addition, a first value $\omega_t$ is a weighting term or factor that may be used to apply different weighting to certain first scores S1 depending on when (i.e., which time slot) their associated preliminary device ID groups occur. For some example configurations, the weighting term $\omega_t$ may be implemented to allow greater weight to be given to first scores associated with time slots identified as "peak" time slots that correspond to peak usage times when the chance of multiple devices being used is considered to be at its highest. Additionally, a second value $\alpha$ is a scalar value that may allow for enhanced fine-grain scaling to factor the repetition of occurrence or appearance. A combination of a particular first-type device ID, $ID1_n$, and a particular second-type device ID, $ID2_k$, occurring or appearing only once during the predetermined time period may not have a confidence score greater than the second value $\alpha$. For some example configurations, the weighting value $\omega_t$ and the scaling value $\alpha$ may both be values within a range of 0 to 1, although other values outside this range may be possible. Additionally, the 1s may be included in equation (3) to provide a second score indicative of a probability value, where the higher the value of the second score the high the confidence level that the associated first-type device ID and second-type device ID identify and/or belong to the same user device 110. Other ways of calculating the second scores using summation of logarithms of the first scores may be possible.

After the second scoring sub-module 414 calculates the second scores S2, it may provide the second scores S2 to the threshold module 406. The threshold module 406 may be configured to determine whether a second score S2 shows a sufficiently high level of confidence for the threshold module 406 to conclude or confirm that a particular first-type device ID, $ID1_n$, and a particular second-type device ID, $ID2_k$, identify and/or belong to the same user device 110. For some example configurations, the threshold module 406 may make the determination by comparing a received second score S2 with a threshold. Based on the comparison, the threshold module 406 may determine whether a particular first-type device ID, $ID1_n$, and a particular second-type device ID, $ID2_k$, associated with the second score S2 identify and/or belong to the same user device 110. How the threshold module 406 makes the determination may depend on how the second score S2 is calculated and how its value corresponds with a confidence level. In some example configurations, if the second score S2 exceeds the threshold, then the threshold module 406 may determine that the associated first-type device ID,$ID1_n$, and the second-type device ID, $ID2_k$, identify and/or belong to the same user device 110. In other example configurations, the reverse evaluation is performed, such that if the second score S2 is below the threshold, then the threshold module 406 may determine that the associated first-type device ID, $ID1_n$, and the second-type device ID, $ID2_k$, identify and/or belong to the same user device 110. Various ways of comparing a second score S2 with a threshold to determine whether a particular first-type device ID and a particular second-type device ID identify and/or belong to the same user device 110 may be possible.

If the threshold module 406 determines that a particular first-type device ID, $ID1_n$, and a particular second-type device ID, $ID2_k$, associated with a given second score S2 qualify as identifying the same user device 110, the threshold module 406 may be configured to store the particular first-type device ID, $ID1_n$, and the particular second-type device ID, $ID2_k$, as a qualifying device ID group in the device ID group database 120. Various ways of storing qualifying first-type and second-type device IDs may be possible. In general, the device ID group database 120 may be configured to link a particular first-type device ID, $ID1_n$ with a particular second-type device ID, $ID2_k$ such that when one of the particular first-type device ID, $ID1_n$, or the second-type device ID, $ID2_k$, is known, the other one can be obtained or identified by accessing and/or performing a lookup in the device ID group database 120. In some example configurations, the threshold module 406 may be configured to generate a unique device ID that associates a particular first-type device ID,$ID1_n$, with a particular second-type device ID, $ID2_k$, and that uniquely identifies a particular user device 110, although other ways of linking a particular first-type device ID, $ID1_n$, with a particular second-type device ID, $ID2_k$, in the device ID group database 120 may be possible.

Figure 5:
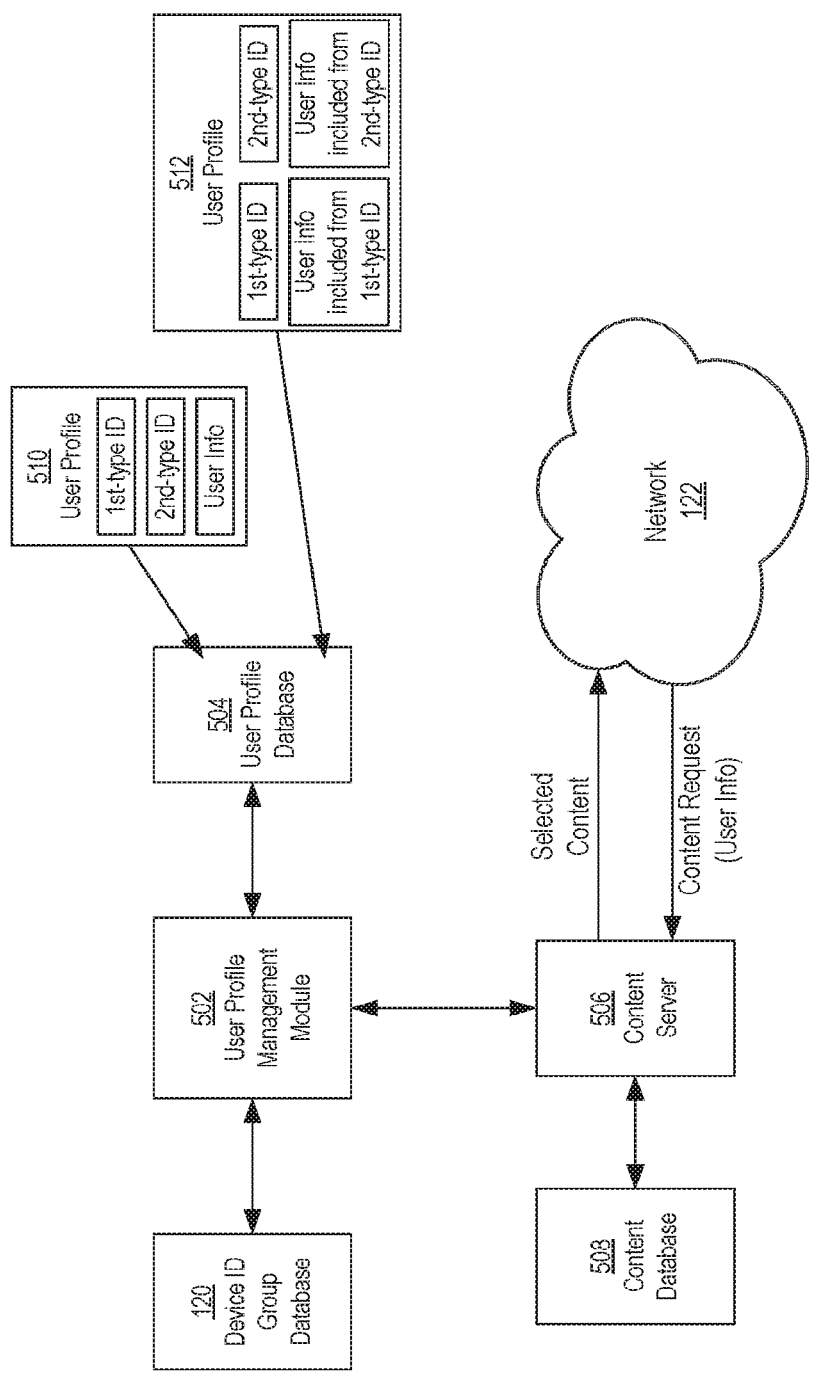
FIG. 5 is a block diagram of components of the electronic system of FIG. 1 involved in managing user profiles based on linking performed by the device linking system and selecting and transmitting advertisements based on the user profiles.

FIG. 5 shows components of an electronic system, such as of the electronic system 100, that may use the qualifying device ID group information in the device ID group database 120 for targeted or personalized network-based content serving, such as targeted or personalized advertising. One of the components in FIG. 5 may be a user profile management module 502, which may be a component of the analytics server 114 or an ad server 106 of FIG. 1, or another server or computing device of the electronic system 100. In general, the user profile management module 502 may collect information about users of the user devices, such as age, gender, demographics, interests, Internet browsing history, and download history, as non-limiting examples. In addition, the user profile management module 502 may be configured to build user profiles for identified users that includes the collected user information. Additionally, the user profile management module 502 may be configured to manage, maintain, and/or update the user profiles. The user profile management module 502 may be configured to store the user profiles in a user profile database 504.

The user profile management module 502 may be configured to include or link a particular first-type device ID, $ID1_n$, or a particular second-type device ID, $ID2_k$, with a user profile. For example, information relating to browser history or application usage history may be collected from information requests sent by web browser modules 302 and application modules 304 of user devices 110, as previously described with reference to FIG. 3. First-type and second-type device IDs associated with the information may be included or linked with the information from the requests that is added to the use profiles. Additionally, the user profile management module 502 may be able to use the first-type device ID and the second-type device ID in order to identify a particular user profile for which to add information.

As shown in FIG. 5, the user profile management module 502 may be in communication with a content server 506 that is configured to send selected content over the network 122 for display on user devices 110. An example content server 506 may be a publisher server 102 or an ad server 106. The content server 506 may receive a content request for content to be displayed on a user device 110. (If the request is for an advertisement, then content request may be considered an ad request). The content request may include user information associated with the user device 110 on which the content is to be displayed. In some example situations, the user information may include a first-type device ID or a second-type device ID. In response to receipt, the content server 506 may communicate with the user management module 502 to identify a user profile in order to identify information about the user. Doing so may assist the content server 506 in selecting particular content from a content database 508 that may be of interest to the user. An example content database may be a publisher database 104 or an ad database 108. In general, content may be any advertisement or non-advertisement content to be displayed on a user device 110 in response to a request received by the content server 506 from over the network 122. The content database 506 may store various content, and the content server 506 may be configured to access the content database 506 to select particular content pursuant to the request.

In some example configurations, without being able to know whether or not a particular first-type device ID, $ID1_n$, is linked with a particular second-type device ID, $ID2_k$, the user profile management module 502 may be configured to generate multiple, disconnected user profiles for a single user device 110, one for the particular first-type device ID,$ID1_n$, and a second for the particular second-type device ID, $ID2_k$. In addition or alternatively, if at a given point in time, the user profile management module 502 had only linked one device ID to a given user profile, if the content server 506 then receives a content request that includes the other device ID, the content server 506 may not be able to leverage the information in the user profile when selecting particular content since the two device IDs will not have been associated with each other. In other words, the content server 506 may believe that the device ID it received is for a new user device 110, and not one for which it already has available user information.

In the configuration shown in FIG. 5, the user profile module 502 may be configured to access the device ID group database 120 to identify linked first-type and second-type device IDs, and in response to the access, build and/or update user profiles. For example, as shown in FIG. 5, each of the user profiles 510 and 512 are shown to include, be associated with, and/or linked to a first-type device ID and a second-type device ID. Additionally, if prior to accessing the device ID group database 120, if the user profile management module 502 created two user profiles, one for a first-type device ID and a second for a second-type device ID, then upon identifying the link, the user profile management module 502 may be configured to combine the two user profiles, as shown with the user profile 512. After identifying a link between a first-type device ID and a second-type device ID through access of the device ID group database 120, the user profile management module 502 may be configured to update a given user profile by receipt of user information associated with either the first-type device ID or the second-type device ID. In this way, building of user profiles performed by the user profile management module 502 may be improved since it is able to leverage two device IDs instead of one. Additionally, the selection and corresponding serving of the selected content may be improved since the content server 506 may be able to select particular content among a plurality of different content using information from a user profile it may not otherwise have had access to if the user profile management module 502 had not identified a link between a first-type device ID and a second-type device ID.

Figure 6:
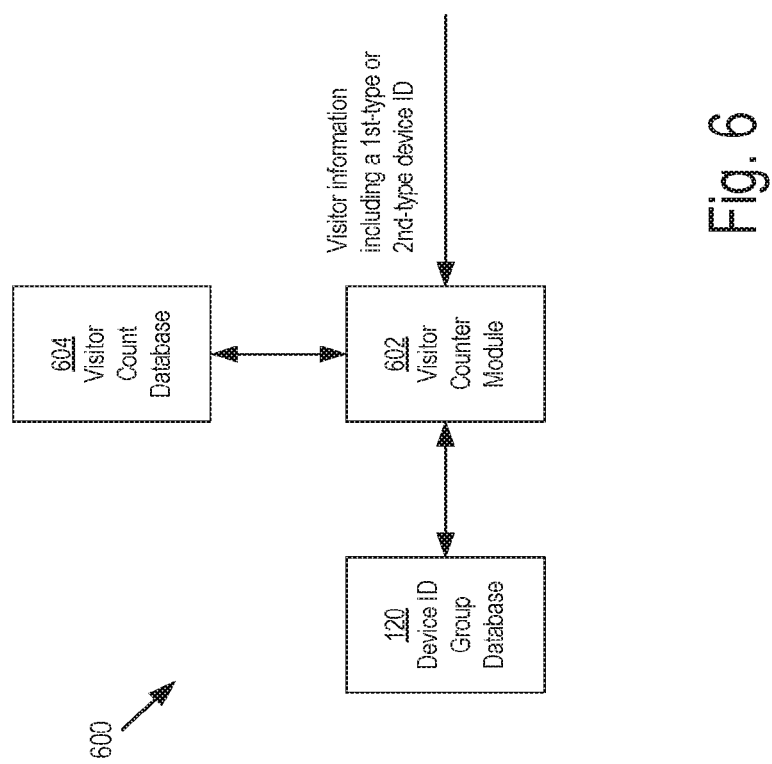
FIG. 6 is block diagram of a system that counts visitors based on the device ID group database.

FIG. 6 shows another example system 600 that may use the linked first-type and second-type device ID information included in the device ID group database 120 to perform visitor counts. In particular, the system 600 may include a visitor counter module 602 that is configured to count visitors to a website, a webpage, or other similar network location. In addition or alternatively, the visitor counter module 602 may be configured to count the number of times a single, or unique visitor has visited a network location. The visitor counter module 602 may be configured to store one or more visitor counts in a visitor count database 604.

The visitor counter module 602 may be configured to receive visitor information to network locations, such as a result of information requests made by web browser modules 302 and application modules 304 of user devices 110, which include first-type device IDs or second-type device IDs. Without knowing whether a particular first-type device ID, $ID1_n$, and a particular second-type device ID, $ID2_k$, belong to and/or identify the same user device 110, the visitor counter module 602 may operate to identify the particular first-type device ID, $ID1_n$, and the particular second-type device ID, $ID2_k$, as being different visitors. As a result, the visitor counter module 602 may undesirably over-count a total number of actual, unique visitors to a particular network location, and/or may under-count the number of times a single user has visited a particular network location.

Conversely, the visitor counter module 602 shown in FIG. 6 may be configured to access the device ID group database 120 to more accurately identify a visitor count. For example, when the visitor counter module 602 receives visitor information including a device ID of one of the types, the visitor counter module 602 may access the device ID group database 120 to see if a user device 110 associated with that device ID has previously visited the network location, either under the device ID of that same type, or under a device ID of the other type. By being able to link the two types of device IDs, the visitor counter module 602 may be able to determine that a particular user already visited the network location using a different device ID and correctly not update a total visitor count stored in the visitor count database 604. In addition or alternatively, the visitor counter module 602 may be able to determine that a particular user previously visited the network location under a different device ID, and correctly update a visitor count for that particular user stored in the visitor count database 604 and not a visitor count for a new or different user.

Figure 7:
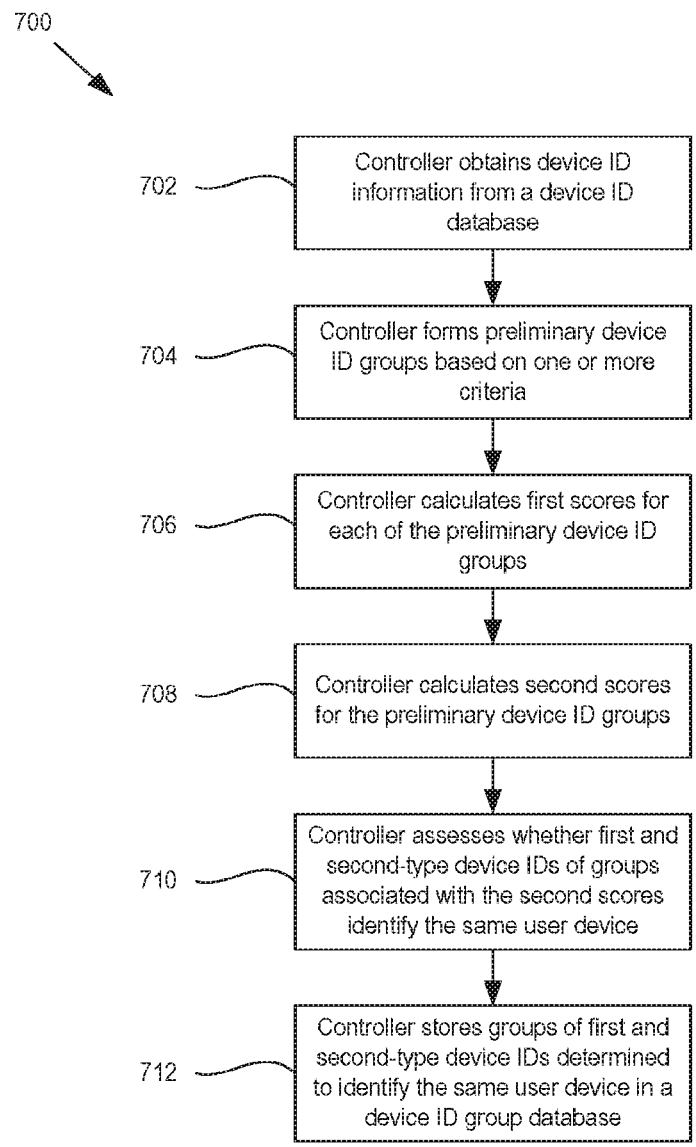
FIG. 7 is a flow chart of an example method of assessing whether a first-type device ID and a second-type device ID identify a same user device.

FIG. 7 is a flow chart of an example method 700 of assessing whether a first-type device ID and a second-type device ID identify a same user device, such as a user device 110 of FIG. 1. At block 702, a controller of a computing device (e.g., a controller of one of the computing devices of the electronic system 100 and/or implementing the modules of FIG. 4) may be configured to access a device ID database (e.g., the device ID database 116 of FIG. 1) to obtain device ID information associated with a predetermined time period. The device ID information may include first-type device IDs and second-type device IDs, each with and/or indicating associated device information and time information, such as a time stamp, a network address, an operating system, an operating system version, and/or a device model.

At block 704, the controller may form preliminary device ID groups, with each group including a first-type device ID and a second-type device ID. The controller may form the groups based on one or more criteria. For example, the controller may decide to group together a first-type device ID and a second-type device ID if their time stamps fall in the same time slot and if their network addresses match. In addition, for some example methods, the controller may decide to group together a first-type device ID and a second type device ID if their associated information does not provide an indication that they are associated with different devices, such as the information does not indicate that they are associated with different operating systems, different operation system versions, and/or different device models, as non-limiting examples. In addition or alternatively, the controller may decide not to group together a first-type device ID and a second-type device ID if their associated network address is a mobile carrier network address.

At block 706, after the preliminary device ID groups are formed, the controller may calculate first scores for each of the preliminary device ID groups. As a result of forming the preliminary device ID groups at block 704 based on the one or more criteria, each of the preliminary device ID groups may be associated with one of a plurality of time slots within the predetermined time period. At block 706, for some example methods, a first score for a given preliminary device ID group may be based on a cardinality of the first-type device IDs and a cardinality of the second-type device IDs for the time slot associated with the given preliminary device ID group, such as according to equation (1) above.

At block 708, after the first scores are calculated, the controller may calculate second scores for the preliminary device ID groups. A single second score may be generated for one or more preliminary device ID groups that have the same first-type device ID and the same second-type device ID, across one or network addresses and over the time slots within the predetermined time period. For some example methods, the controller may calculate a second score by summing and/or taking an average of the first scores of the preliminary device ID groups for which a single second score is to be calculated, such as according to equation (2) above. For other example methods, the controller may calculate a second score by summing natural logarithms of the first scores of the preliminary device ID groups for which a single second score is to be calculated, and then calculating an exponential of the natural log summation, such as according to equation (3) above. For some of these methods, a weighting factor may be used in the summation to weight certain first scores based on the time slots in which they occur. In addition or alternatively, a scaling factor may be used in the summation to provide finer granularity for repeated occurrence or appearance of preliminary device ID groups having the same first-type device ID and second-type device ID.

At block 710, the controller may assess whether a particular first-type device ID and a particular second-type device ID associated with a second score qualify as identifying and/or belonging to the same user device. The controller may do so for each group of first-type device ID and second-type device ID associated with a second score. In addition, the controller may do so by comparing the second score with a threshold. Based on the comparison, the controller may determine whether there is a sufficient amount of confidence for the controller to conclude that the particular first-type device ID and the particular second-type device ID belong to and/or identify the same user device.

At block 712, the controller may store, in a device ID group database, each qualifying group of first-type device ID and second-type device ID that is associated with a second score indicating a sufficient amount of confidence based on the comparisons performed at block 710. Each qualifying group in the device ID group database may link its particular first-type device IDs and second-type device IDs such that a device with one of the first-type device ID or the second-type device ID may access the device ID group database to identify the other first-type device ID or the second-type device with which the first one is linked.

Figure 8:
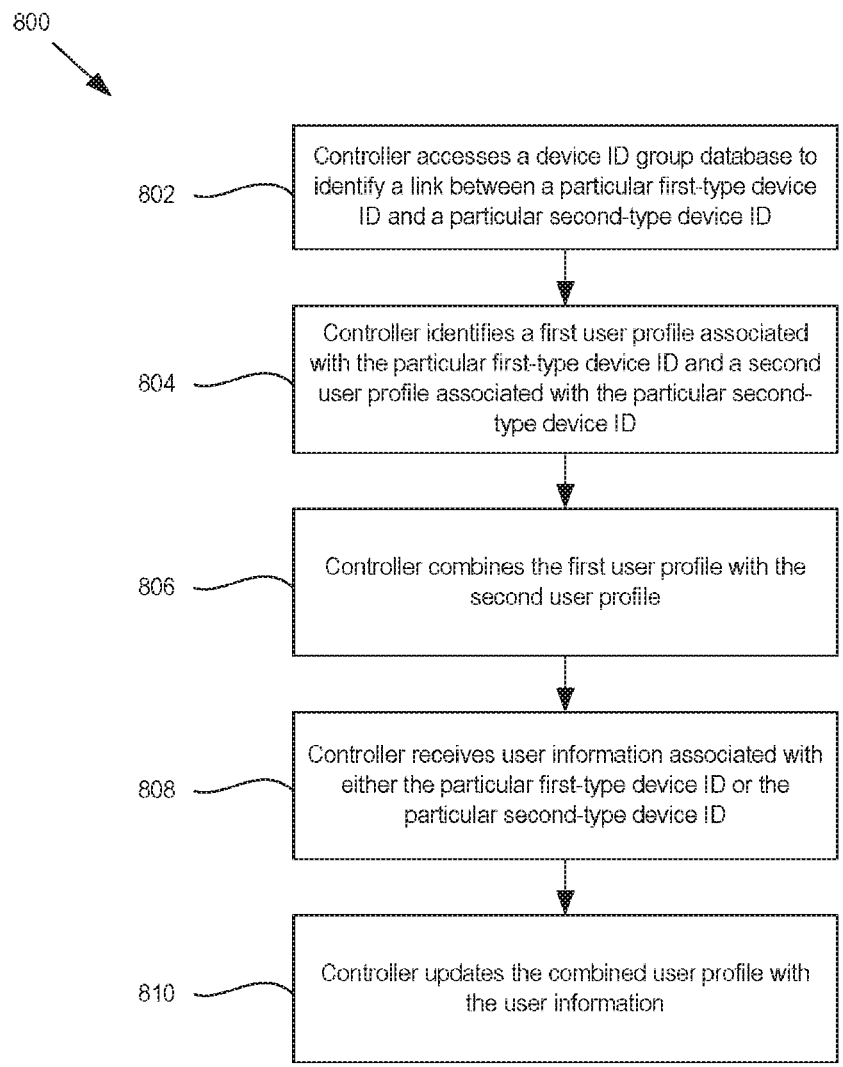
FIG. 8 is a flow chart of an example method of managing user profiles.

FIG. 8 is a flow chart of an example method 800 of managing user profiles. At block 802, a controller, such as a controller that includes the user profile management module 502 of FIG. 5, may access a device ID group database (e.g., the device ID group database 120 of FIGS. 1 and 4), to identify a link between a particular first-type device ID and a particular second-type device ID. At block 804, the controller may identify a first user profile associated with the particular first-type device ID and a second user profile associated with the particular second-type device ID. At block 806, based on the link identified at block 802 and the identification of the first and second user profiles made at block 804, the controller may combine the first user profile with the second user profile to form a combined user profile associated with both the particular first-type device ID and the particular second-type device ID. At block 808, the controller may receive user information associated with either the particular first-type device ID or the particular second-type device ID. At block 810, the controller may update the combined user profile with the user information received at block 808.

Figure 9:
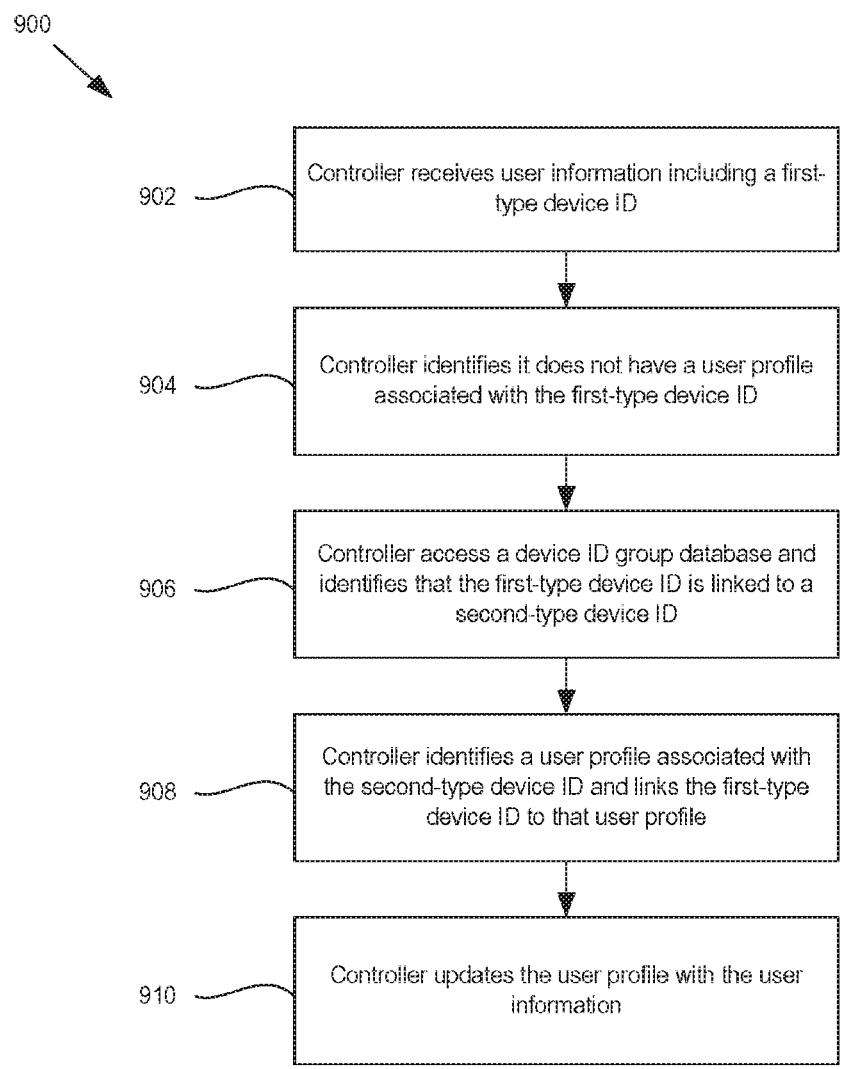
FIG. 9 is a flow chart of another example method of managing user profiles.

FIG. 9 is a flow chart of another example method 900 of managing user profiles. At block 902, a controller, such as a controller that includes the user profile management module 502 of FIG. 5, may receive user information including a first-type device ID. At block 904, the controller may identify that it does not have a user profile associated with the first-type device ID. At block 906, the controller may access a device ID group database (e.g., the device ID group database 120 of FIGS. 1 and 4), and identify that the first-type device ID is linked to a second-type device ID. At block 908, the controller may identify a user profile associated with the second-type device ID and link the first-type device ID to that user profile. At block 910, the controller may update the user profile with the user information received at block 902.

Figure 10:
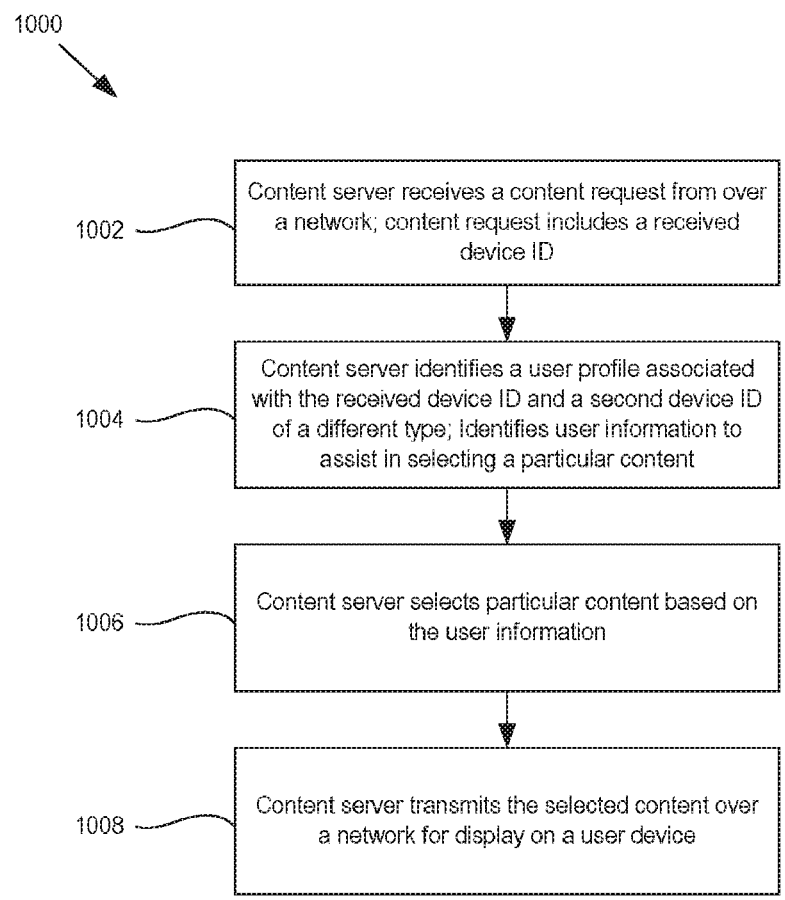
FIG. 10 is a flow chart of an example method of transmitting advertisements for display on a user device.

FIG. 10 is a flow chart of an example method 1000 of transmitting selected or personalized content for display on a user device, such as one of the user device 110 of FIG. 1. The method 1000 may be performed with a content server, such as the content server 506 of FIG. 5. At block 1002, the content server may receive a content request from over a network. The content request may be a request for the content server to select particular content from a content database (e.g., the content database 508 of FIG. 5). In addition, the content request may include a received device ID, which may be of a first type or of a second-type.

At block 1004, the controller may identify a user profile associated with the received device ID, and identify user information included in the user profile to assist the controller is selecting particular content. The user profile may be associated with the received device ID and also a second device ID of a different type than the type of the received device ID. In some example methods, the user information included in the user profile that the controller identifies may have been added to the user profile due to having been associated with the second device ID when received or otherwise identified by a computing device that created and managed the user profile. In addition or alternatively, the user information may have been added to the user profile before the device ID matching the one that the controller received at block 1002 was linked to the second device Id and the user profile.

At block 1006, the content server may select particular content from the content database based on the user information identified at block 1004. At block 1008, the content server may transmit the selected content over the network for display on the user device. In some examples, the method may include the receipt and display of the selected content on a display screen of the user device.

Figure 11:
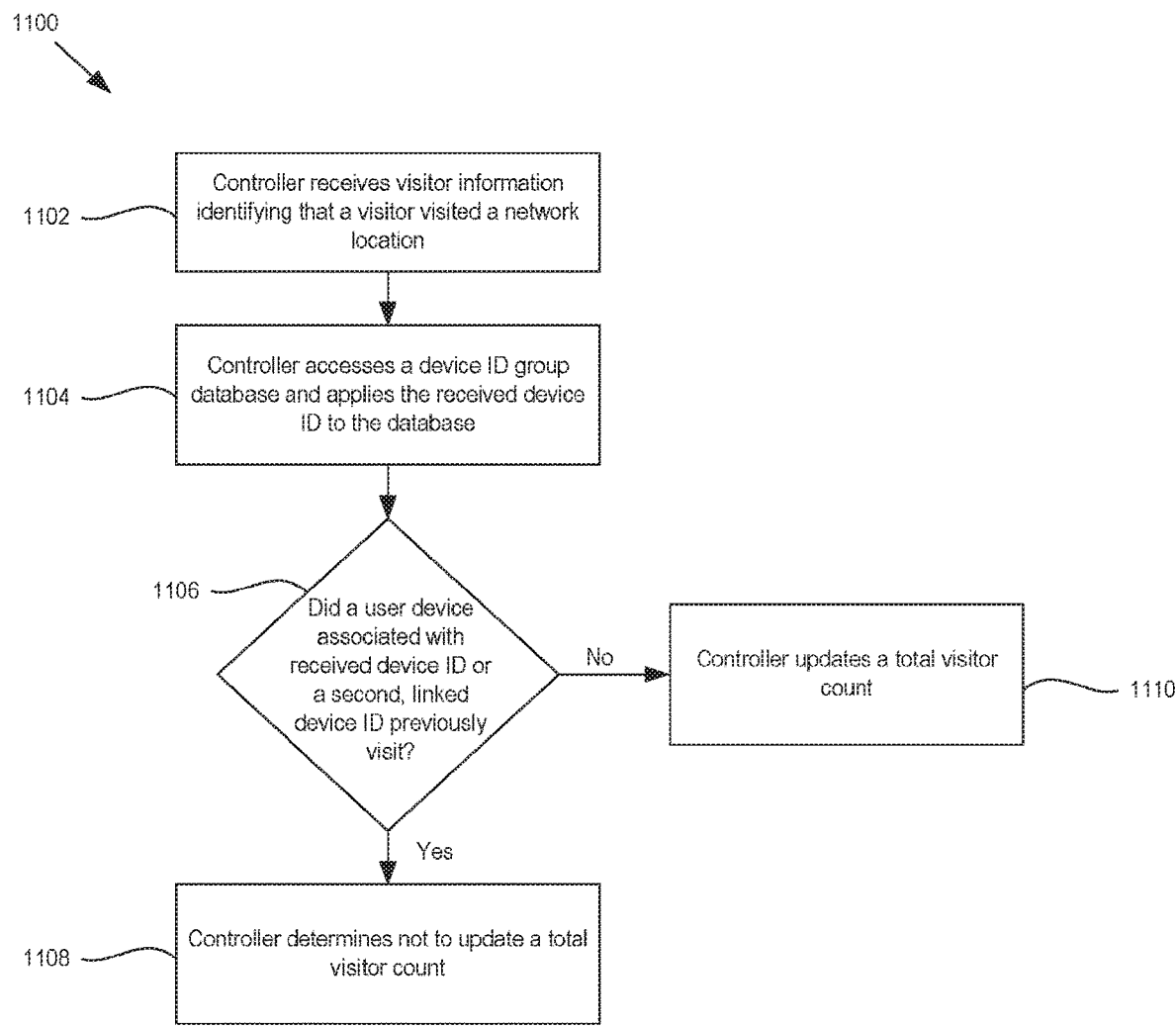
FIG. 11 is a flow chart of an example method of counting a total number of different visitors to a network location.

FIG. 11 is a flow chart of an example method 1100 of counting a total number of different visitors to a network location. The method may be performed with a controller of a computing device, such as one implementing the visitor counter module 602 of FIG. 6. At block 1102, the controller may receive visitor information identifying that a visitor, such as a user of a user device 110, visited a network location, such as a website or a webpage. The visitor information may include a received device ID of a first-type or a second-type. At block 1104, the controller may access a device ID group database (e.g., the device ID group database 120 of FIGS. 1 and 4), and apply the received device ID included in the visitor information to the device ID group database. At block 1106, based on the application, the controller may determine whether a user device associated with the received device ID or a second device ID linked to the received device ID in the device ID group database previously visited the network location. If so, then at block 1108, the controller may determine that the user associated with the visitor information received at block 1102 already visited the network location, and determine not to update a total visitor count of the network location stored in a visitor count database (e.g., the visitor count database 604 of FIG. 6). If not, then at block 1110, the controller may determine that the user associated with the visitor information received at block 1104 is a new visitor to the network location, and update the total visitor count of the network location stored in the visitor count database.

Figure 12:
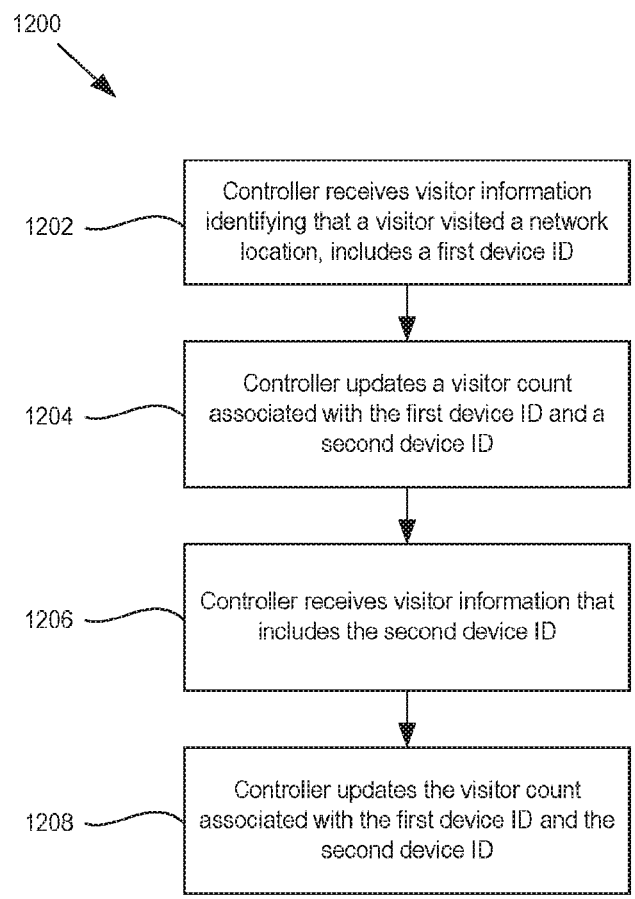
FIG. 12 is a flow chart of an example method of counting a number of times a visitor has visited a network location.

FIG. 12 is a flow chart of an example method 1200 of counting a number of times a visitor has visited a network location. The method may be performed with a controller of a computing device, such as one implementing the visitor counter module 602 of FIG. 6. At block 1202, the controller may receive visitor information identifying that a visitor, such as a user of a user device 110, visited a network location, such as a website or a webpage. The visitor information may include a first device ID of a first-type or a second-type. At block 1204, the controller may update a visitor count associated with the first device ID that is stored in a visitor count database (e.g, the visitor count database 604 of FIG. 6). The visitor count may also be associated with a second device ID of a different type than the first device ID, and that is linked to the first device ID in a device ID group database (e.g., the device ID group database 120 of FIGS. 1 and 4). In some example methods, the controller may have determined to associate both the first device ID and the second device ID with the same visitor count by accessing or otherwise using the information in the device ID group database. At block 1206, the controller may receive visitor information that includes the second device ID. At block 1208, the controller may update the visitor account associated with both the first device ID and the second device ID.

Other methods that can be performed may include a combination of some or all of the methods described with reference to FIGS. 7-12. For example, the actions performed in the methods 700 and 800 of FIGS. 7 and 8, in the methods of 700 and 900 of FIGS. 7 and 9, and/or in the methods of 700, 800, and 900 may be combined for other or additional methods of creating and/or managing user profiles. As another example, the actions performed in the methods of 700 and 1000 of FIGS. 7 and 10, and/or in some combination of the methods of 700, 800, 900, and 1000 of FIGS. 7-10 may be combined for other or additional methods of selecting and/or transmitting selected content. As still another example, the actions performed in the methods of 700 and 1100 of FIGS. 7 and 11, in the methods of 700 and 1200, or in some combination of the methods of 700, 1100, and 1200 may be combined for other or additional methods of managing visitor counts. Still other methods may combine all of the described methods together. Various combinations of the actions performed in FIGS. 7-12, in addition to the actions performed by the system, device, database, and module components described with reference to FIGS. 1-6, may be formed.

Additionally, although the present description describes ways of determining if multiple device IDs identify the same user device for two types of device IDs, the present description is not limited to only two types of device IDs, and similar operations may be performed to form groups of three or more types of device IDs, and determine whether such groups identify and/or belong to the same user device. Also, the present description is not limited to device IDs only associated with web browsers and applications, and similar operations may be performed with other types of device IDs in order to determine whether such device IDs identify and/or belong to the same user device. In addition, the present description is not limited to identifying only user devices, but is also applicable to identification of other devices, such as servers or other computing devices, for which it may be desirable to identify a single physical device using multiple device IDs.

It is intended that the foregoing detailed description be understood as an illustration of selected forms that the invention can take and not as a definition of the invention. It is only the following claims, including all equivalents, which are intended to define the scope of the claimed invention. Finally, it should be noted that any aspect of any of the preferred embodiments described herein can be used alone or in combination with one another.

What is claimed is:

1. An electronic system comprising:
    a memory comprising a device identification (ID) group database; and
    a hardware processor configured to:
        preliminarily determine that a first-type device ID and a second-type device ID identify a same device;
        group the first-type device ID and the second-type device ID into a device ID group in response to the preliminary determination;
        calculate a score for the device ID group, comprising the first-type device ID and the second-type device ID, based on one or more cardinalities associated with one or more device IDs in the device ID group;
        confirm that the first-type device ID in the device ID group and the second-type device ID in the device ID group both identify the same device based on the score for the device ID group comprising the first-type device ID and the second-type device ID; and
        store the first-type device ID and the second-type device ID as linked together in the device ID group database in response to the confirmation.

2. The electronic system of claim 1, wherein the preliminarily determining that the first-type device ID and the second-type device ID identify the same device is based on a determination that the first-type device ID and the second-type device ID are both associated with a same network address.

3. The electronic system of claim 2, wherein the same network address comprises an Internet Protocol (IP) address.

4. The electronic system of claim 1, wherein the preliminarily determining that the first-type device ID and the second-type device ID identify the same device is based on a determination that the first-type device ID and the second-type device ID are both associated with a same time slot.

5. The electronic system of claim 1, wherein the hardware processor is further configured to calculate a summation of a plurality of initial scores for the device ID group to determine the score.

6. The electronic system of claim 1, wherein the hardware processor is further configured to, in order to determine the score:
    calculate a plurality of logarithmic values associated with the device ID group; and
    sum together the plurality of logarithmic values.

7. The electronic system of claim 6, wherein the plurality of logarithmic values are each further based on a weighting factor corresponding to a time slot of a respective one of a plurality of initial scores for the device ID group.

8. The electronic system of claim 1, wherein the hardware processor is further configured to:
    determine first cardinalities of first-type device IDs and second cardinalities of second-type device IDs, each of the first cardinalities and each of the second cardinalities corresponding to one of a plurality of time slots associated with the device ID group, wherein a plurality of initial scores for the device ID group are determined based on the first cardinalities and the second cardinalities.

9. The electronic system of claim 1, wherein the hardware processor is further configured to, in response to the confirmation that the first-type device ID and the second-type device ID both identify the same device, link the second-type device ID with a user profile of a user of the same device, wherein the user profile was already linked to the first-type device ID prior to the confirmation.

10. The electronic system of claim 9, wherein after the linking, the hardware processor is further configured to:
    in response to receipt of user information associated with the second-type device ID:
        identify the user information as being associated with the user; and
        add the user information to the user profile.

11. The electronic system of claim 9, wherein the user profile comprises a first user profile, and wherein the hardware processor is further configured to combine a second user profile associated with the second-type device ID with the first user profile to form an aggregated user profile for the user of the same device in response to the linking.

12. The electronic system of claim 9, further comprising:
a content server configured to:
after the linking, receive a content request identifying user information associated with the second-type device ID; and
select content for sending to the same device, wherein the selection is based on user information that was initially added to the user profile prior to the linking.

13. The electronic system of claim 1, wherein the hardware processor is further configured to:
receive visitor information indicating a user visited a network location, the visitor information identifying at least one of the first-type device ID or the second-type device ID;
in response to receipt of the visitor information, apply at least one of the first-type device ID or the second-type device ID to the device ID group database; and
update a visitor count based on the link between the first-type device ID and the second-type device ID in the device ID group database.

14. The electronic system of claim 1, wherein the first-type device ID is associated with at least one of a web browser or an application, and the second-type device ID is associated with at least one of a second web browser or a second application, at least one the web browser or the application and at least one of the second web browser or the second application being configured to run on the same device.

15. A method comprising:
grouping a first-type device identification (ID) and a second-type device ID into a device ID group based on one or more criteria;
calculating a score for the device ID group comprising the first-type device ID and the second-type device ID;
confirming that the first-type device ID in the device ID group and the second-type device ID in the device ID group both identify a same device based on the score for the device ID group comprising the first-type device ID and the second-type device ID;
in response to the confirmation that the first-type device ID and the second-type device ID both identify the same device, linking the second-type device ID with a user profile of a user of the same device, wherein the user profile was already linked to the first-type device ID prior to the confirmation; and
storing the first-type device ID and the second-type device ID as linked together in a device ID group database in response to the confirmation.

16. The method of claim 15, wherein the one or more criteria comprises a determination that the first-type device ID and the second-type device ID are both associated with a same network address.

17. The method of claim 15, wherein the one or more criteria comprises a determination that the first-type device ID and the second-type device ID are both associated with a same time slot.

18. A non-transitory computer readable storage medium comprising instructions that, when executed by a hardware processor, implement operations comprising:
receiving visitor information indicating a user visited a network location, the visitor information identifying at least one of a first-type device identification (ID) or a second-type device ID;
in response to receipt of the visitor information, applying at least one of the first-type device ID or the second-type device ID to a device ID group database;
grouping the first-type device ID and the second-type device ID into a device ID group;
calculating a score for the device ID group comprising the first-type device ID and the second-type device ID;
confirming that the first-type device ID in the device ID group and the second-type device ID in the device ID group both identify a same device based on the score for the device ID group comprising the first-type device ID and the second-type device ID;
storing the first-type device ID and the second-type device ID as linked together in the device ID group database in response to the confirmation; and
updating a visitor count based on the link between the first-type device ID and the second-type device ID in the device ID group database.

19. The non-transitory computer readable storage medium of claim 18, wherein the grouping is responsive to determining that the first-type device ID and the second-type device ID are both associated with a same network address.

20. The non-transitory computer readable storage medium of claim 18, wherein the grouping is responsive to determining that the first-type device ID and the second-type device ID are both associated with a same time slot.

* * * * *